United States Patent
Hofmann et al.

(10) Patent No.: US 12,298,490 B2
(45) Date of Patent: May 13, 2025

(54) METHOD FOR AUTOMATICALLY DETERMINING THE POSITION IN A SAMPLE ARRANGEMENT AND CORRESPONDING MICROSCOPE

(71) Applicant: LEICA MICROSYSTEMS CMS GMBH, Wetzlar (DE)

(72) Inventors: Tobias Hofmann, Solms (DE); Christof Stey, Wetzlar (DE); Volker Schacht, Marburg (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 1018 days.

(21) Appl. No.: 17/298,623

(22) PCT Filed: Dec. 4, 2019

(86) PCT No.: PCT/EP2019/083725
§ 371 (c)(1),
(2) Date: May 31, 2021

(87) PCT Pub. No.: WO2020/115160
PCT Pub. Date: Jun. 11, 2020

(65) Prior Publication Data
US 2022/0050281 A1    Feb. 17, 2022

(30) Foreign Application Priority Data
Dec. 7, 2018   (DE) ..................... 10 2018 131 427.2

(51) Int. Cl.
*G02B 21/26*   (2006.01)
*G02B 21/02*   (2006.01)
(Continued)

(52) U.S. Cl.
CPC ............. *G02B 21/26* (2013.01); *G02B 21/02* (2013.01); *G02B 21/34* (2013.01); *G02B 21/365* (2013.01)

(58) Field of Classification Search
None
See application file for complete search history.

(56) References Cited

U.S. PATENT DOCUMENTS

| 5,136,149 A | 8/1992 | Fujiwara et al. |
| 5,604,344 A | 2/1997 | Finarov |

(Continued)

FOREIGN PATENT DOCUMENTS

| CN | 103048779 A | 4/2013 |
| DE | 19923821 A1 | 11/2000 |

(Continued)

*Primary Examiner* — Jyotsna V Dabbi
(74) *Attorney, Agent, or Firm* — LEYDIG, VOIT & MAYER, LTD.

(57) ABSTRACT

A method for automatically determining a plurality of positions in a sample arrangement in the object space of a microscope that includes a microscope objective defining an optical axis is provided. A measurement beam is generated by a measurement beam device and directed at the sample arrangement, and a measurement beam reflected by the sample arrangement is detected by a detector, which produces an output signal. The sample arrangement is displaced in at least one direction perpendicular to the optical axis. The plurality of positions in the sample arrangement is determined on the basis of the displacement by means of output signals of the detector generated during the displacement in the at least one direction.

24 Claims, 4 Drawing Sheets

(51) Int. Cl.
*G02B 21/34* (2006.01)
*G02B 21/36* (2006.01)

(56) References Cited

U.S. PATENT DOCUMENTS

| | | |
|---|---|---|
| 6,091,075 A | 7/2000 | Shibata et al. |
| 6,594,006 B1 | 7/2003 | Muehlhoff et al. |
| 2007/0008536 A1 | 1/2007 | Mitani et al. |
| 2008/0297795 A1 | 12/2008 | Yonggang |
| 2009/0303321 A1* | 12/2009 | Olson .................. H04N 1/053 |
| | | 348/E5.045 |
| 2011/0317260 A1 | 12/2011 | Krueger |
| 2012/0097835 A1 | 4/2012 | Sharonov |
| 2012/0314206 A1 | 12/2012 | Spizig et al. |
| 2013/0094016 A1 | 4/2013 | Knebel et al. |
| 2013/0278941 A1 | 10/2013 | Loerch |
| 2015/0168212 A1 | 6/2015 | Yamaguchi |
| 2016/0328635 A1* | 11/2016 | Dave ................. G01B 11/0608 |
| 2017/0276924 A1 | 9/2017 | Chan et al. |
| 2017/0329115 A1 | 11/2017 | Turgeman et al. |
| 2017/0351081 A1 | 12/2017 | Dowaki et al. |

FOREIGN PATENT DOCUMENTS

| | | |
|---|---|---|
| DE | 102010030430 B4 | 1/2015 |
| EP | 1177523 B1 | 8/2013 |
| EP | 2642326 A2 | 9/2013 |
| EP | 3101385 A1 | 12/2016 |
| JP | H08-211282 A | 8/1996 |
| WO | WO 2005/088280 A1 | 9/2005 |
| WO | WO 2011131311 A1 | 10/2011 |

* cited by examiner

METHOD FOR AUTOMATICALLY DETERMINING THE POSITION IN A SAMPLE ARRANGEMENT AND CORRESPONDING MICROSCOPE

CROSS-REFERENCE TO PRIOR APPLICATIONS

This application is a U.S. National Phase application under 35 U.S.C. § 371 of International Application No. PCT/EP2019/083725, filed on Dec. 4, 2019, and claims benefit to German Patent Application No. DE 10 2018 131 427.2, filed on Dec. 7, 2018. The International Application was published in German on Jun. 11, 2020 as WO 2020/115160 under PCT Article 21(2).

FIELD

The present invention relates to a method for automatically ascertaining positions on a sample arrangement in the object space of a microscope and to a corresponding microscope. In particular, the invention relates to the automatic detection of the spatial position of a sample carrier in the case of in particular adjustable holding devices in microscopy.

BACKGROUND

For examining biological samples in particular, upright and inverted microscopes are known from the prior art. These generally have an xy-microscope stage that is movable in a plane perpendicular to the optical axis of the microscope, as it is defined by the microscope objective. The microscope stage has a coordinate system that can be used to approach any position. In this way it is possible to approach specific points at which a sample examination is to take place and/or to define specific regions within which the sample is to be traveled or scanned. The corresponding points or regions are usually entered by a user, for which purpose a visual check is usually carried out by viewing microscopic images. When using known holding devices (holders) in which the slide or, more generally, the sample carrier assumes a fixed position, the approach to a position and/or the scanning of a region can also take place automatically.

When using universal holders as a holding device with an adjustable frame for holding different sample carriers, especially a slide, a Petri dish or multiwell plate or similar, a defined position on the sample carrier cannot be approached since, owing to the adjustability of the holder, there is no longer a fixed reference between the microscope stage coordinate system and the position of the sample carrier. Due to the missing reference, the user must move the sample carrier to the desired position in a visual manner. Such manual intervention by the user is usually time-consuming and can be cumbersome. In closed systems in which there is no or only limited visual contact between the user and the sample carrier, such manual positioning is even more cumbersome and error-prone, if not impossible.

Against this background, it is desirable to automatically ascertain positions on a sample arrangement, for example a holding device and/or a sample carrier, in order to be able to carry out positioning based on the ascertained positions and/or to be able to define sample regions for the subsequent microscopic examination.

SUMMARY

In an embodiment, the present invention provides a method for automatically ascertaining a plurality of positions on a sample arrangement in an object space of a microscope, which comprises a microscope objective, which defines an optical axis, the method comprising: generating a measurement beam by a measurement beam device and directing the measurement beam onto the sample arrangement; capturing a measurement beam reflected by the sample arrangement by a detector, which generates an output signal; displacing the sample arrangement in at least one direction perpendicular to the optical axis as a displacement; and ascertaining the plurality of positions on the sample arrangement depending on the displacement by output signals generated by the detector during the displacement in the at least one direction.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
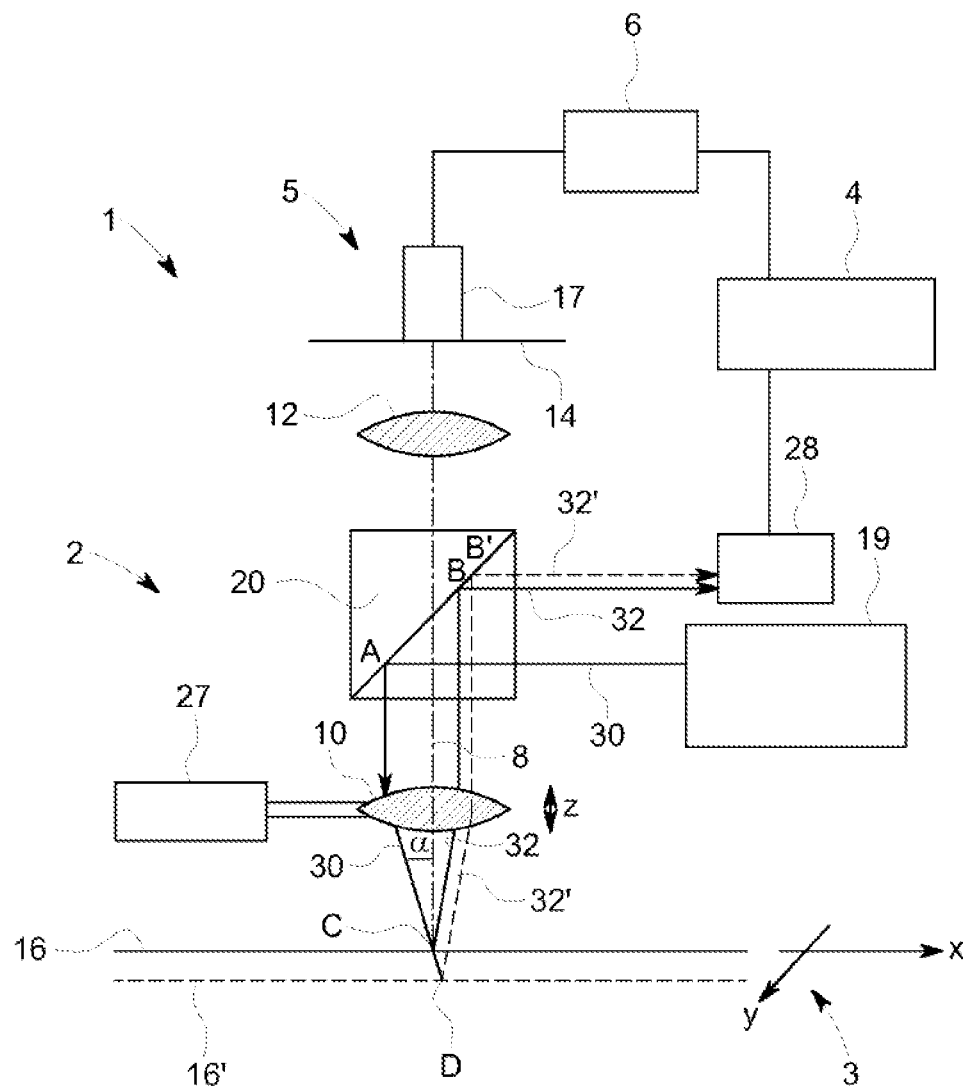
FIG. 1 schematically shows an embodiment of a microscope according to the invention.

In an embodiment, the present invention provides a method for automatically ascertaining a plurality of positions on a sample arrangement in the object space of a microscope and a corresponding microscope.

The method according to the invention is used to automatically ascertain positions on and/or in a sample arrangement in the object space of a microscope, wherein the microscope comprises a microscope objective that defines an optical axis. The positions to be ascertained are, in particular, delimitation points of elements forming the sample arrangement, that is to say for example periphery points, starting points or end points of an element in relation to a specific direction. To ascertain such positions, a measurement beam is generated by a measurement beam device of the microscope and directed onto the sample arrangement, and a measurement beam reflected by the sample arrangement is captured by a detector, which generates an output signal. The sample arrangement is displaced in at least one direction perpendicular to the optical axis. Depending on this displacement, the positions on the sample arrangement are ascertained by means of output signals generated by the detector during the displacement in the at least one direction.

The output signal generated by the detector is in particular sensitive at least also with regard to a change in height in the sample arrangement (hereinafter also referred to as "height-sensitive detector signal"). Consequently, if specific elements of the sample arrangement have different heights, that is to say extents in the z-direction parallel to the optical axis, the detector signal changes if the measurement beam is reflected at these elements of different heights during the displacement of the sample arrangement. As an alternative or in addition, the detector signal can be sensitive with respect to a material change in the sample arrangement (hereinafter also referred to as "material-sensitive detector signal"). In this case, the detector signal changes if the measurement beam is reflected at elements of different materials during the displacement of the sample arrangement. This is particularly advantageous if the extent in the z-direction within the sample arrangement does not change, but the refractive index does, including for example in the case of industrial samples that are embedded in silicone or the like. In such cases it is possible to detect sample regions with the same refractive index or the same reflectivity. The detector signal is often sensitive to both height and material, so that changes with regard to the extent in the z-direction and also with regard to the refractive index can be detected.

The output signals generated by the detector are advantageously evaluated with regard to signal edges present in order to determine the plurality of positions on the sample arrangement. Signal edges occur, for example, in the case of the height- and/or material-sensitive detector signals mentioned, as a rule whenever an input variable, such as height or material on the sample arrangement, changes in the displacement direction. A specific point on such a signal edge can then be assigned a corresponding location in the displacement direction and thus a corresponding position on the sample arrangement.

It is advantageous if the measurement beam device generates a directed measurement beam and couples the latter into the microscope parallel to the optical axis via a deflection element in such a way that the measurement beam is incident on the sample arrangement via the microscope objective. After reflection at the sample arrangement, a reflected measurement beam is preferably incident through the microscope objective on a deflection element and from there on the detector, with the deflection element preferably being one and the same deflection element.

The sample arrangement examined according to the invention expediently comprises one or more of the following elements: a holding device for a sample carrier, wherein such a holding device is usually referred to as a holder or holding frame, and/or a sample carrier, which may be a slide, a glass carrier, a Petri dish, a cell cultivation system, a chambered coverglass system, a multiwell plate, and/or a cover slip, including a chambered coverglass system, and/or a sample. The sample arrangement can therefore be, for example, a holder or holding frame with an inserted slide, wherein a thin biological sample that in turn lies under a cover slip has been placed on the slide. Of course, some of the elements mentioned may also be absent. In such a sample arrangement, when the sample arrangement is displaced in one direction, in particular the respective delimitation points of these elements, i.e. the starting and end points of the holder and/or the slide and/or the cover slip and/or, possibly, the sample, in this direction can be determined with the method according to the invention. In optional configurations explained further below, it is also possible to ascertain the delimitation points of a sample and/or sample regions in a reliable manner.

The invention is used advantageously using a triangulating autofocus device. Such a triangulating autofocus device generates an autofocus measurement beam, which is usually directed onto a sample region via the microscope objective, wherein a measurement beam reflected there is in turn guided to an autofocus detector via the microscope objective. This detector generates an output signal that changes when the distance between the microscope objective and the sample region changes, and is therefore height-sensitive in the sense defined above. Such an autofocus device is typically used to set and/or maintain the focus before or during a sample examination with a microscope.

For the purposes of providing a better understanding, the invention will be explained in more detail below without restricting the generality in connection with such a triangulating autofocus device. Such a triangulating autofocus device is known per se, for example, from U.S. Pat. No. 5,136,149 B1 and will be explained in more detail with reference to the attached FIG. 1. It should be noted that FIG. 1 merely describes the basic principle of such an autofocus device 2. An advantageous further development is known, for example, from the applicant's German patent specification DE 10 2010 030 430 B4. With regard to details, modes of operation and construction, express reference is made to the documents mentioned. As shown in FIG. 1, an autofocusing light source 19 is arranged in such a way that after the autofocus measurement beam 30 has been deflected and passed through the microscope objective 10, the object plane 16 is struck obliquely or at an angle. A position-sensitive autofocus detector 28 detects the lateral offset of an incident beam 32, as will be described further below. The autofocus device furthermore comprises a motor 27 for moving the objective 10 in the direction of the optical axis 8 (z-direction). As an alternative or in addition, the object plane 16 can also be displaced in the direction of the optical axis 8.

In the autofocus device 2 according to FIG. 1, the measurement beam 30 is deflected by the beam splitter 20 at a point A in the direction of the objective, through which the deflected beam 30 is incident obliquely or aslant at point C on the object plane 16 at an angle α. The reflected measurement beam 32 again reaches the beam splitter 20 via the objective 10 and is directed there into the detector 28 at a point B. Its output signal depends on the location at which the beam 32 is incident, so that the location is determined thereby.

In the case of defocusing, i.e. in the present example according to FIG. 1 in the case of a displacement of the object plane 16 into the plane 16' (or a shift of a point to be imaged from the plane 16 into the plane 16'), the measurement beam 30 is not reflected until it is reflected at the reflection point D, which is displaced with respect to the point C not only in the direction of the optical axis 8, but also laterally or sideward with respect thereto. As can be seen from FIG. 1, the corresponding reflected beam 32 ', which is incident on point B' in the beam splitter 20, reaches the detector 28 at a different location and thus supplies a signal that is different from the focus position. In this way, the degree of defocusing can be measured and compensated again by the motor 27, which is controlled by the autofocus device 2 and moves the objective lens 10. FIG. 1 furthermore shows a tube lens 12 and the image plane 14 of the microscope 1. Further statements regarding FIG. 1 can be found below in the description of the figures.

The output signal generated by the detector 28 of the autofocus device is thus correlated with the distance between the microscope objective 10 and the object plane 16 and is therefore "height-sensitive" in the sense defined above. The present advantageous embodiment of the invention makes use of this fact for the ascertainment of positions on a sample arrangement. If, instead of the object plane 16 shown in FIG. 1, a sample arrangement with elements that have different extents/heights in the z-direction is situated in the object space, the detector 28 of the autofocus device supplies different output signals depending on the extent/ height of an element in the z-direction. At the same time, the detector signal is typically also material-sensitive in the sense defined above. When the sample arrangement is displaced in a direction perpendicular to the optical axis 8, the output signals generated thus result in a height-sensitive and, as a rule, also material-sensitive profile, as seen by way of the autofocus device. From this it is then possible, in particular, to determine delimitation or starting and end points of an element of the sample arrangement in the displacement direction. It should be emphasized that the present invention thus does not use any already existing autofocus device for its actual purpose of setting or maintaining the focus, but for the entirely different purpose of determining positions of interest on a sample arrangement.

In other words, a triangulating autofocus device, which is used during the normal operation of a microscope to set and/or maintain the focus on a desired object plane, can be used to ascertain positions on a sample arrangement by correspondingly evaluating the output signals generated by the detector of the autofocus device. During the normal operation of a microscope, these output signals indicate a change in distance between the microscope objective and the selected reference object plane, with the result that the autofocus device correspondingly displaces the microscope objective and/or the object plane to compensate for such a change in distance. In the present embodiment of the invention, by contrast, the height- and/or material-sensitive output signals generated by the detector are used before the actual microscope operation to ascertain specific positions on the sample arrangement that has been displaced in a specific direction. For this purpose, for example, the generated output signal can be recorded during the displacement of the sample arrangement and a profile resulting therefrom can be evaluated. As explained further below, this profile can be correlated with the height profile and/or the material profile of the sample arrangement in the displacement direction.

To displace the sample arrangement in at least one direction, an xy-microscope stage of the microscope, which is moved in the x- and/or y-direction, is advantageously used. For example, it is possible for the sample arrangement at different y-coordinates to be displaced in each case in the x-direction. In this way, a plurality of profiles running in the x-direction can be generated, which can be combined to form a two-dimensional profile map.

When using an xy-microscope stage, specific xy-coordinates of this microscope stage can be assigned to the positions ascertained on the sample arrangement. In this way, it is possible to approach the ascertained positions again at a later point in time, in particular during the microscopic examination. Furthermore, it makes sense to use the ascertained positions on the sample arrangement to define a sample region for the sample examination with the microscope (also called "work region"). In the case of a sample arrangement described in the introductory part comprising a holder, a slide, a sample and a cover slip, the region of the cover slip can be defined as a useful work region for examining the sample. In this way, regions outside of the cover slip can be excluded from the sample examination in a meaningful way. Another possibility of limiting the work region to the sample located under the cover slip is explained further below.

It is advantageous to already reduce the number of positions to be ascertained for defining the sample region or work region in a known sample arrangement by taking into account previously stored dimensions or geometries of this known sample arrangement. In a database, generally from a memory, a user can select, for example, which type of holding frame to use to hold the sample carrier (glass slide, Petri dish or well plate). The database provides the dimensions of the holding frame with the fixed axes of the sample receptacle. With this information, the possible position of the sample carrier can be meaningfully restricted. The method according to the invention can then expediently be used only within the already restricted region for ascertaining the delimitation points of the sample carrier used.

In a further advantageous configuration, brightness and/or contrast signals are generated and evaluated by means of an optical evaluation device of the microscope during the displacement of the sample arrangement in one direction. In particular, microscopic images can be recorded for this purpose by means of an image generation device of the microscope during the displacement of the sample arrangement in one direction, and the recorded images can be evaluated with regard to changes in brightness and/or contrast. During the generation of the aforementioned profile or the aforementioned profile map, brightness and/or contrast values can be recorded in parallel using corresponding signals of the optical evaluation device or, in particular, images can be recorded by means of an image generation device of the microscope, i.e. typically a camera. The evaluation of the recorded signals or images with regard to changes in brightness and/or contrast is expediently carried out by comparing the recorded signals or images with one or more comparison signals or images. If a change in brightness has taken place, this information is additionally linked to the associated output signal of the detector in the displacement direction and/or to the associated xy-coordinates of the microscope stage. In this way, for example, a change in brightness can be registered if a sample appears in the displacement direction after an empty glass slide. The associated location of this change in brightness then corresponds to the starting point of the sample in the examined displacement direction. This information can be used to define the work region in order to identify the sample on the slide in this way and to be able to restrict the work region to the sample. In this context, it may also be expedient to use this evaluation to ascertain dimensions of the sample in each case in the aforementioned displacement direction. In the case of a two-dimensional scanning/displacement of the sample, the extent of the sample in the xy-plane can be ascertained in this way.

It is particularly advantageous if the output signals generated by the detector of the autofocus device in the course of the displacement of the sample arrangement in the at least one direction are used to present a profile (in one dimension) or a profile map (in two dimensions) of the sample arrangement. This configuration was already mentioned further above and will be explained in detail in connection with the exemplary embodiments.

The invention furthermore relates to a microscope which is set up to carry out the method according to the invention.

The microscope according to the invention comprises a microscope objective, which defines an optical axis, a measurement beam device for generating a measurement beam directed onto a sample arrangement, and a detector for capturing a measurement beam reflected by the sample arrangement, wherein the detector generates an output signal, furthermore comprises a displacement device for displacing the sample arrangement in at least one direction perpendicular to the optical axis, and furthermore a determination device for automatically ascertaining a plurality of positions on the sample arrangement. In this case, the determination device is designed in such a way that the positions on the sample arrangement are determined by means of output signals generated by the detector during a displacement of the sample arrangement in the at least one direction in dependence on the displacement.

With regard to configurations and advantages of the microscope according to the invention, reference is made in full to the statements made in connection with the corresponding method according to the invention.

The microscope advantageously comprises a memory, in particular in the form of a database, for storing dimensions of known sample arrangements. In this regard, too, reference is made to the statements made in connection with the method according to the invention.

The microscope according to the invention advantageously comprises an optical evaluation device for generating and evaluating brightness and/or contrast signals during the displacement of the sample arrangement, in particular in the form of an image generation device for generating microscopic images during the displacement of the sample arrangement and of an image evaluation device for evaluating changes in brightness and/or contrast of the generated images. With regard to this embodiment, too, reference is made to the statements made in connection with the method according to the invention.

The determination device of the microscope according to the invention is advantageously designed in such a way that specific xy-coordinates of a microscope stage, which forms the displacement device of the microscope, are assigned to the ascertained positions on the sample arrangement. The determination device is furthermore advantageously designed in such a way that a work region for sample examination is defined using the ascertained positions. Furthermore, the determination device can advantageously be designed in such a way that, for defining the work region, the evaluation of the recorded signals of the optical evaluation device or images of the image generation device with regard to changes in brightness and/or contrast is used and/or dimensions of a sample situated on the sample arrangement are determined by way of the evaluation of the recorded signals or images with regard to changes in brightness and/or contrast.

Finally, the invention relates to a computer program with program code, wherein, when it is executed on a computing unit assigned to a microscope according to the invention, a method according to the invention is carried out. Furthermore, the invention relates to a corresponding computer program product with a computer program with program code stored thereon, wherein, when it is executed on a computing unit assigned to a microscope according to the invention, a method according to the invention is carried out. The computer program can be downloaded or uploaded as such or be stored or buffered on a computer program product. Volatile or non-volatile storage media, such as, for example, a USB stick, RAM or ROM memory of a known type, are suitable as the computer program product. The aforementioned computing unit can be the control device of the microscope or a part of this control device. The aforementioned determination device of the microscope according to the invention can be part of this computing unit and/or of the aforementioned control device.

Further advantages and configurations of the invention are evident from the description and the accompanying drawing.

It goes without saying that the features mentioned above and the features yet to be discussed below may be used not only in the respectively specified combination but also in other combinations or individually without departing from the scope of the present invention.

The invention is illustrated schematically in the drawing using an exemplary embodiment and is described below with reference to the drawing.

The figures are described generally. Identical reference signs denote identical or similar elements. The embodiment according to FIG. 1 has already been described further above to explain the construction and mode of operation of a triangulating autofocus device, and an advantageous embodiment of the invention using such an autofocus device will now be explained in more detail. The triangulating autofocus device is denoted by 2 as a whole. It comprises at least one autofocusing light source 19 for generating the measurement beam 30, the beam splitter 20 for deflecting the measurement beam 30 in the direction of the object plane 16, and a detector 28, on which the measurement beam 32 reflected at the object plane 16 is incident. In the manner already explained above, a displacement of the object plane 16 to 16' can be detected by the detector 28, since the reflected measurement beam 32 is displaced into the reflected measurement beam 32'. During normal operation of a microscope 1, such a displacement of the object plane is compensated by the fact that the autofocus device 2 controls the motor 27, which displaces the microscope objective 10 in the z-direction in such a way that the distance between the objective 10 and the object plane remains unchanged. Alternatively or in addition, it is possible if the object plane 16 is displaceable in the z-direction, for example by means of a microscope stage that is displaceable in the z-direction, for a displacement of the object plane 16 in the z-direction to be effected.

In addition to these elements already explained, the microscope 1 shown in FIG. 1 also has a displacement device 3 for displacing a sample arrangement located on the object plane 16 (not shown in FIG. 1) in at least one direction perpendicular to the optical axis 8. This displacement device 3 can be an xy-microscope stage. The x- and y-directions are marked accordingly in FIG. 1. The microscope 1 furthermore comprises a determination device 4 for automatically ascertaining positions P1 to P8 (cf. FIG. 2), on the sample arrangement, wherein the determination device 4 is designed in such a way that these positions are determined by means of output signals generated by the detector 28 of the autofocus device 2 during a displacement of the sample arrangement in one direction. For this purpose, the determination device 4 is connected to the detector 28 for signal transmission, wherein it is possible for this connection to be realized by cable or wirelessly.

The determination of positions on the sample arrangement is expediently carried out before the start of normal operation of the microscope 1, in particular to define a suitable work region, that is to say sample region for the sample examination, for this normal operation. The determination of positions on the sample arrangement thus takes place before the intended operation of the autofocus device 2 for setting or maintaining the focus. During the automatic ascertainment of positions on the sample arrangement, the autofocus device 2 is thus not configured to compensate any displacements of the autofocus measurement beam 30 in the z-direction due to the sample arrangement scanned in one direction, for example by displacing the microscope objective 10 using a motor. Rather, the output signals generated by the detector 28 of the autofocus device 2 are used for the automatic ascertainment of prominent positions on the measured sample arrangement. This will be explained in more detail with reference to FIG. 2.

Figure 2:
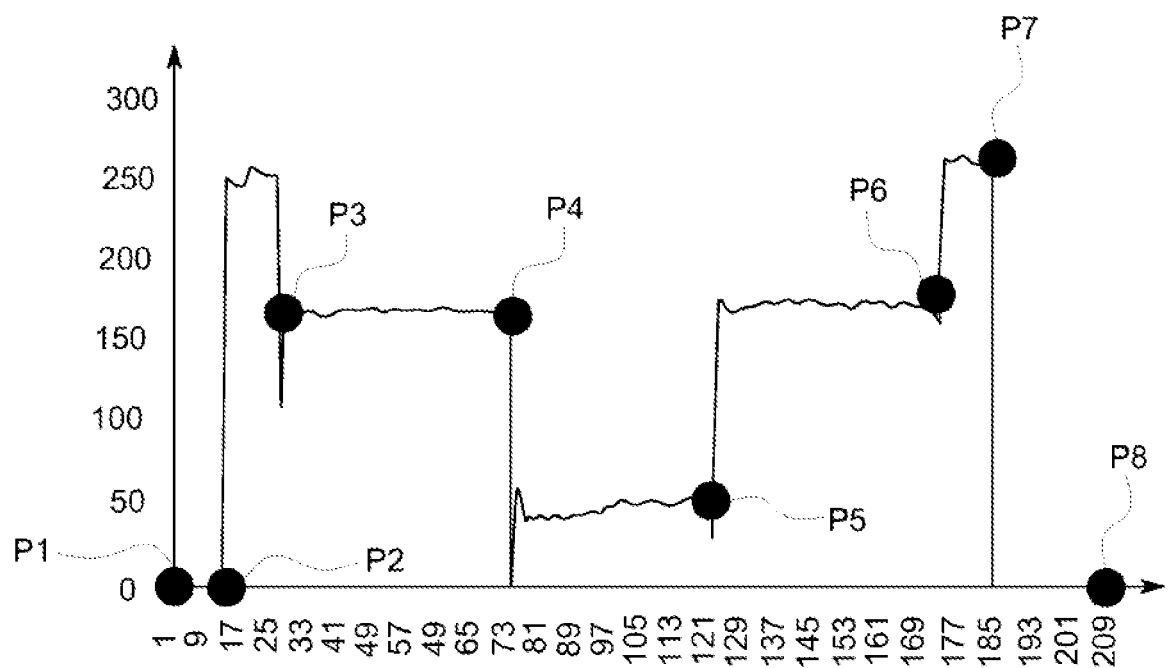
FIG. 2 shows the output signal of a detector of an autofocus device of a microscope according to the invention when a sample arrangement is displaced in one direction in the object space of the microscope, in one possible embodiment, FIG. 3 schematically shows a possibility for generating a profile map for a sample arrangement, and FIG. 4 schematically shows an embodiment of a sample arrangement with a possibility of determining a possible work region.

FIG. 2 schematically shows the output signals generated when a sample arrangement is displaced in one direction or the time profile of the output signal of the detector 28 of the autofocus device 2 shown in FIG. 1. For example, the xy-microscope stage 3 from FIG. 1 is moved for this purpose in the x-direction along the long edge of a sample arrangement (cf. FIG. 4) while the output signals of the autofocus device 2 are evaluated. In the example illustrated in FIG. 2, the sample arrangement comprises a holding frame within which a slide is fixed, wherein a cover slip has been placed on the slide. The sample to be examined is usually located between the slide and the cover slip.

As long as there is no object between the microscope objective 10 and the object plane 16, the detector 28 will not output a signal. As soon as the edge of the adjustable holding frame is moved over the objective 10 during the further displacement of the sample arrangement, the detector 28 receives a signal and outputs, based on the change in height and/or material that has occurred, a corresponding output signal (first edge), by way of which the position of the edge of the holding frame is known. In FIG. 2, P1 denotes the starting point of the displacement of the sample arrangement, for example in the x-direction, and P2 denotes the first edge of the holding frame. P3 denotes the beginning of the slide (second flank), which in the case shown has a masked glass surface. P4 denotes the beginning of the cover slip (third flank) and P5 denotes its end (fourth flank). P6 denotes the end point of the slide and the starting point of the holding frame (fifth flank). P7 denotes the end point of the holding frame (sixth and last flank); in addition, the detector 28 does not emit an output signal due to the lack of a reflection of the measurement beam 30. Finally, P8 denotes the end of the movement range. The positions P1 to P8 can be saved together with the associated stage coordinates and interpreted as a (one-dimensional) profile of the sample arrangement. The evaluation of the profile allows for conclusions to be drawn about the position but also the nature of the sample arrangement, since the nature of the surface of the sample arrangement affects the signal strength of the reflected measurement beam 32 and thus also of the output signal of the detector 28.

If the abscissa of FIG. 2 is specified in or converted into stage coordinates, the profile shown in FIG. 2 leads to the relative position of the holding frame between P2 and P7, the relative position of the slide between P3 and P6, and the relative position of the cover slip between P4 and P5 in stage coordinates. The work region for the subsequent microscopic examination can now be defined to be the innermost region between P4 and P5 or a subregion of said region. The microscopic examination then takes place within the defined work region, wherein for this purpose, the autofocus device 2 is returned to its original intended use. If the stage is positioned on the work region, a focus correction in the z-direction takes place, for which purpose a previously calibrated z-value is adjusted with the autofocus device 2, which z-value lies in the focus region of the microscope 1 and is then corrected by the thickness of the cover slip. This procedure is known per se. The microscope 1 can be an upright microscope, as shown in FIG. 1, or it can be an inverted microscope. The latter microscopes are often used to examine thin biological samples.

During the above-described ascertainment of the profile of the sample arrangement, images can advantageously be recorded in parallel by way of an image generation device 5 of the microscope 1, as is illustrated schematically in FIG. 1. Instead of images, it can be sufficient to record only brightness and/or contrast gradients. A camera 17 of the image generation device 5 is here arranged schematically with its light-sensitive detector surface in the image plane 14 of the microscope 1. The images generated are examined in particular for changes in brightness by means of an image evaluation device 6. The changes can be determined in each case in relation to the previous image or a comparison image. If a change in brightness has taken place, this information is additionally linked to the corresponding stage position and to the associated value of the output signal of the detector 28. With this procedure, for example, the beginning of a sample within the region of the cover slip, that is to say, for example, within the region of the positions P4 and P5 according to FIG. 2, can be detected during the displacement of the sample arrangement. In the same way, the end of the sample within the region of the cover slip can be detected. In this way, the dimension of the sample in the displacement direction is obtained. This information can in turn be applied to the work region to be defined for the sample examination.

Figure 3:
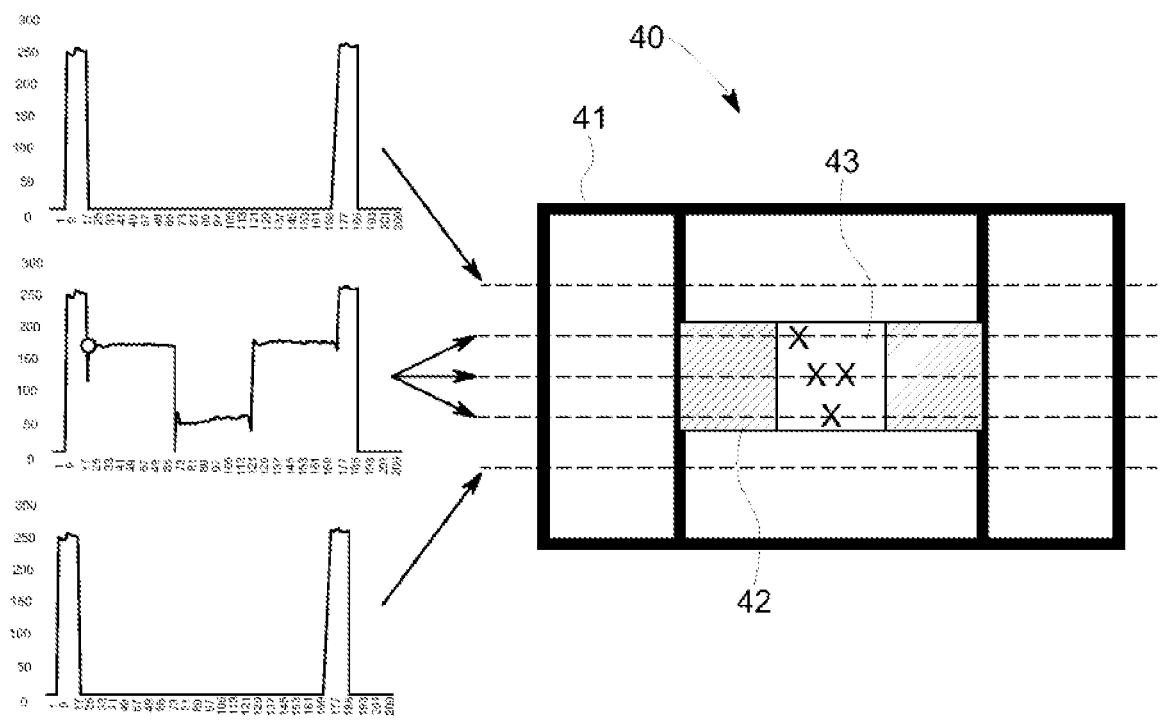

FIG. 3 now shows an advantageous extension for creating a profile map over the entire sample arrangement or over essential parts of this sample arrangement. The sample arrangement itself is denoted by 40. In this exemplary embodiment, it again consists of a holding device or a holding frame 41, a sample carrier or slide 42, and a cover slip 43. A sample to be examined is arranged between the cover slip 43 and the slide 42. Sample points of interest are marked with X. Without restricting the generality, the long edge of the sample arrangement 40 can be defined as the x-direction, and the short edge of the sample arrangement 40 perpendicular thereto can be defined as the y-direction. Profiles of output signals of the detector 28 of the autofocus device 2 recorded at various points in the y-direction are shown in FIG. 3. Profiles recorded within the slide 42 correspond to the profile explained in connection with FIG. 2. Profiles recorded outside of this region only show only the beginning and end of the holding frame as positions, corresponding to points P2 and P3 or P6 and P7 from FIG. 2. A two-dimensional profile map, from which the delimitation points of the cover slip 43 in both directions (x, y) can be gathered, can be obtained in this way by a close-meshed measurement in the y-direction. The work region for the subsequent examination of the sample can then be kept within these delimitation points. By additional image recording or recording of brightness gradients, as described above, the delimitation of the sample can also be ascertained in this way, and the work region for the subsequent microscopic examination can be defined accordingly.

Figure 4:
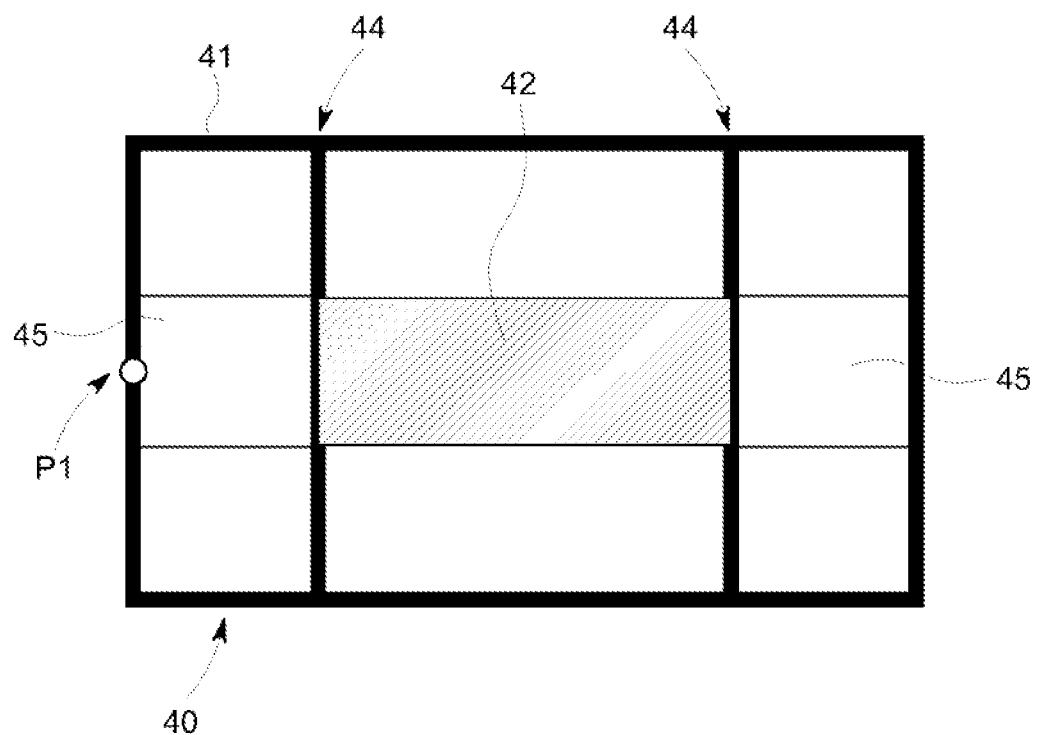

Finally, FIG. 4 shows an embodiment of a sample arrangement 40 as it leads to the profiles described in connection with FIGS. 2 and 3. The sample arrangement 40 again comprises a holding frame 41 as a holding device, a slide 42 as a sample carrier, and a cover slip located on the slide 42. The adjustable mount of the holding frame 41 is denoted by 44. The adjustable mount 44 allows the slide 42 to be positioned along the longer longitudinal side of the sample arrangement 40. Possible positions 45 of the slide 42 are marked accordingly.

If the dimensions of the sample arrangement 40 are known, they can be stored in a memory or, better still, in a database. From this database, the user can select the type of holding device 41 or, more generally, the type of sample arrangement 40, which he uses to hold the sample carrier 42 (glass slide, Petri dish or well plate). The database provides the dimensions and the fixed axes of the sample arrangement 40. Using this information, it is already possible to restrict the possible position 45 of the slide 42. The microscope stage can then be moved to the starting position P1, which is located in the middle of the smaller edge of the slide 42 and at the left periphery of the longer edge of the possible position region 45. The measurement then takes place, as described with reference to FIG. 2 and/or FIG. 3. After a work region has been defined, the actual microscopic examination can begin.

The present invention is particularly suitable for defining a work region, in particular if a visual determination of this work region is not possible or is too complicated.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

1 Microscope
2 Autofocus device
3 Displacement device, xy-microscope stage
4 Determination device
5 Image generation device
6 Image evaluation device
8 Optical axis
10 Microscope objective
12 Tube lens
14 Image plane
16, 16' Object plane
17 Camera
19 Measurement beam light source, autofocusing light source
20 Beam splitter
27 Motor
28 Detector, autofocus detector
30 Measurement beam, autofocus measurement beam
32, 32' Reflected measurement beam
40 Sample arrangement
41 Holding device, holding frame
42 Sample carrier, slide
43 Cover slip
44 Adjustable mount
45 Possible positions
A, B, B', C, D Point
x, y, z Spatial direction
α Angle

The invention claimed is:

1. A method for automatically ascertaining a plurality of positions on a sample arrangement in an object space of a microscope, which comprises a microscope objective, which defines an optical axis, the method comprising:
generating a measurement beam by a light source of a triangulating autofocus device, and directing the measurement beam onto the sample arrangement;
capturing a reflected measurement beam reflected by the sample arrangement by a detector of the triangulating autofocus device, which generates an output signal;
displacing the sample arrangement in at least one direction perpendicular to the optical axis as a displacement; and
ascertaining the plurality of positions on the sample arrangement based on the output signals generated by the detector during the displacement in the at least one direction, wherein the triangulating autofocus device is configured not to compensate displacements of the autofocus measurement beam along the optical axis during the displacing the sample arrangement and the ascertaining the plurality of positions on the sample arrangement.

2. The method of claim 1, wherein the output signals generated by the detector are evaluated with regard to signal edges present in order to determine the plurality of positions on the sample arrangement.

3. The method of claim 2, wherein the plurality of positions are defined by delimitation points of at least one element contained in the sample arrangement.

4. The method of claim 3, wherein the at least one element contained in the sample arrangement is selected from a group comprising: a holding device for a sample carrier, a sample carrier, a cover slip, and a sample.

5. The method of claim 1, wherein an xy-microscope stage of the microscope is moved in the x- and/or y-direction in order to displace the sample arrangement in the at least one direction.

6. The method of claim 5, wherein the ascertained positions on the sample arrangement are assigned to specific xy-coordinates of the microscope stage.

7. The method of claim 1, wherein a sample region for a sample examination is defined based on the ascertained positions on the sample arrangement.

8. The method of claim 7, wherein a number of positions to be ascertained for defining the sample region in a known sample arrangement is reduced by considering previously stored dimensions of the known sample arrangement.

9. The method of claim 7, wherein brightness and/or contrast signals are generated and evaluated by an optical evaluation device of the microscope during the displacement of the sample arrangement.

10. The method of claim 9, wherein microscopic images are recorded by an electronic image generation device of the microscope during the displacement of the sample arrangement, and
wherein the microscopic images are evaluated for changes in brightness and/or contrast by an image evaluation device of the microscope.

11. The method of claim 9, wherein evaluation of the brightness and/or contrast signals is used to ascertain the sample region.

12. The method of claim 9, wherein dimensions of a sample located on the sample arrangement are determined by evaluating the brightness and/or contrast signals.

13. The method according to claim 1, wherein a profile or a profile map of the sample arrangement is created from the output signals generated by the detector during the displacement of the sample arrangement in the at least one direction.

14. The method of claim 1, wherein a focus distance between the sample arrangement and the microscope objective is set and/or maintained by evaluating the output signals of the detector of the autofocus device after ascertaining the plurality of positions for examining a sample region.

15. A microscope, comprising:
   a microscope objective, which defines an optical axis;
   a triangulating autofocus device comprising a light source and a detector, wherein the light source is configured to generate a measurement beam directed onto a sample arrangement, and wherein the detector is configured to capture a reflected measurement beam reflected by the sample arrangement and to generate an output signal;
   a displacement device configured to displace the sample arrangement in at least one direction perpendicular to the optical axis; and
   a determination device configured to automatically ascertain a plurality of positions on the sample arrangement, the determination device being configured such that the plurality of positions on the sample arrangement are determined based on the output signals generated by the detector during the displacement of the sample arrangement in the at least one direction, and wherein the triangulating autofocus device is configured not to compensate displacements of the autofocus measurement beam along the optical axis during the displacing the sample arrangement and the ascertaining the plurality of positions on the sample arrangement.

16. The microscope of claim 15, wherein the sample arrangement comprises one or more of: a holding device for a sample carrier, a sample carrier, a cover slip, a sample.

17. The microscope of claim 15, wherein the displacement device comprises an xy-microscope stage.

18. The microscope of claim 17, wherein the determination device is configured such that specific xy-coordinates of the microscope stage are assigned to the ascertained positions on the sample arrangement.

19. The microscope of claim 15, wherein the microscope comprises a memory configured to store dimensions of known sample arrangements.

20. The microscope of claim 15, wherein the determination device is configured such that a sample region for sample examination is defined based on the ascertained positions.

21. The microscope of claim 20, wherein the microscope has an optical evaluation device configured to generate and evaluate brightness and/or contrast signals during the displacement of the sample arrangement.

22. The microscope of claim 21, wherein the optical evaluation device comprises an electronic image generation device of the microscope configured to generate microscopic images during the displacement of the sample arrangement and an image evaluation device configured to evaluate changes in the brightness and/or contrast of the generated images.

23. The microscope of claim 21, wherein the determination device is configured such that, for defining the sample region, an evaluation of the brightness and/or contrast signals is used and/or dimensions of a sample located on the sample arrangement are determined by evaluation of the brightness and/or contrast signals.

24. A non-transitory computer-readable medium having processor-executable instructions stored thereon for execution on a computing unit assigned to the microscope of claim 15, wherein the processor-executable instructions, when executed, facilitate performance of a method for automatically ascertaining a plurality of positions on a sample arrangement in an object space of the microscope, which comprises a microscope objective, which defines an optical axis, the method comprising:
   generating a measurement beam by a measurement beam device and directing the measurement beam onto the sample arrangement;
   capturing a measurement beam reflected by the sample arrangement by a detector, which generates an output signal;
   displacing the sample arrangement in at least one direction perpendicular to the optical axis as a displacement; and
   ascertaining the plurality of positions on the sample arrangement depending on the displacement by output signals generated by the detector during the displacement in the at least one direction.

* * * * *